United States Patent [19]

Czarnecki et al.

[11] 4,167,611

[45] Sep. 11, 1979

[54] METHOD OF PRODUCTION OF COMPOSITIONS WHICH EXHIBIT NO SHRINKAGE OR WHICH INCREASE IN VOLUME DURING SETTING

[75] Inventors: Lech Czarnecki; Mariusz Lyczkowski; Marek Borowiak, all of Warsaw, Poland

[73] Assignee: Politechnika Warszawaska, Warsaw, Poland

[21] Appl. No.: 777,842

[22] Filed: Mar. 15, 1977

[30] Foreign Application Priority Data

Mar. 16, 1976 [PL] Poland .................................. 187961

[51] Int. Cl.² .............................................. C08J 9/00
[52] U.S. Cl. ....................................... 521/88; 521/50;
521/87; 521/92; 521/91; 521/95; 521/98;
521/113; 521/114; 521/122; 521/123; 521/128;
521/117; 521/131; 521/143; 521/181; 521/182;
521/189
[58] Field of Search ........... 260/2.5 R, 2.5 N, 2.5 EP,
260/2.5 HA, 2.5 F; 521/50, 88, 91, 95, 92, 98,
122

[56] References Cited

U.S. PATENT DOCUMENTS

| | | | |
|---|---|---|---|
| 2,664,405 | 12/1953 | Andersen et al. | 260/2.5 N |
| 3,392,127 | 7/1968 | duTertre | 260/2.5 N |
| 3,960,785 | 6/1976 | Babcock | 260/2.5 R |

*Primary Examiner*—Harold D. Anderson
*Attorney, Agent, or Firm*—Haseltine, Lake & Waters

[57] ABSTRACT

The method of production of chemically set compositions which show no shrinkage or which increase their volume during setting finding their application in building engineering, electrotechnical engineering and other fields of technology, consists in adding a special expanding system to a composition comprising synthetic resins or elastomers. Said system consists of an expanding agent, an expansion promoter, and if need be an expansion moderator, and sodium and/or potassium and/or magnesium fluosilicate. As the expanding agent substances are used having a porous structure and sorption properties, as for instance aluminosilicates, and as the expansion promoter substances are used having a polar structure and a critical diameter of the molecule smaller than that of the pores of the expanding agent, as for instance alcohols.

9 Claims, No Drawings

METHOD OF PRODUCTION OF COMPOSITIONS WHICH EXHIBIT NO SHRINKAGE OR WHICH INCREASE IN VOLUME DURING SETTING

BACKGROUND OF THE INVENTION

This invention relates to a method of production of compositions containing synthetic resins or elastomers, which will not shrink or which will increase in volume during setting.

Compositions of said type find application in building engineering as joints, self-tensioning structural elements, sealants etc., as well as in electrical engineering as insulating materials, and in other fields of technology as for instance shock-absorbing inserts.

Chemically setting and thermosetting compounds commonly used are characterized by a reduction in volume during the setting process. The amount of said shrinkage for non-filled compounds extends from 0.5% in the case of epoxy resins even up to 12% for polyester resins. Negative consequences of such a shrinkage consist in stresses generated within the material, causing under certain circumstances the destruction of said material.

Shrinkage during setting of a synthetic material frequently causes, for instance, breakaways of the lining from the cement base, difficulties with lifting of the pattern of some prefabricated units and also makes it impossible to obtain tight joints.

Known building materials which increase their volume are concretes based upon expanding cements. Their relatively low degree of expansion, lack of chemical corrosion resistance and of scratch resistance notably restrict the application possibilities thereof.

Other known materials of the discussed type, as for instance polyurethane foams, although they show satisfactory chemical resistance, provide no properties suitable for a structural material.

SUMMARY OF THE INVENTION

It has been found that it is possible to obtain compositions showing no shrinkage or even increasing their volume, the utility performance whereof renders it possible to use them as chemical and moisture insulation, if into the composition there is incorporated, apart from the chemically setting high-molecular weight compounds, and independently of the setting system and filler, also an expanding system.

The expanding system consists of an expanding agent, a promoter of the expansion and if need be a moderator of the expansion.

DESCRIPTION OF PREFERRED EMBODIMENTS

According to the invention, the expanding agent is a substance having a porous structure and sorption properties, as for instance silica gels, aluminosilica gels, crystalline or partially crystalline synthetic or natural aluminosilicates, aluminum oxide, active magnesium oxide and mineral substances having a packed-and-lamellar structure. Promoters of the expansion are substances having a polar nature and having a critical diameter of the molecule smaller than that of the pores of the expanding agent. If crystalline aluminosilicates of the type 3A are used as the expanding agent, methanol, for example, may be used as the promoter, and in the case of crystalline aluminosilicates of type 4A, apart from methanol, for instance, ethanol of methyl isocyanide is used, and in the case of crystalline aluminosilicates of type 5A halogen derivatives of ethane or methane are used additionally, and in the case of crystalline aluminosilicates of type 10X additionally dioxane, acetone, methyl ethyl ketone, toluene, ethyl ether etc., and in the case of crystalline aluminosilicates of type 13X also 1, 3, 5-trimethylbenzene are used.

The optional expansion moderator is introduced into the composition according to the invention in order to obtain the intended degree of expansion. Examples of such moderators are amorphous or partially amorphous silicates or aluminosilicates, which contain for instance, cations of groups I and/or II of the periodic system and/or an aluminum cation and/or an ammonium cation. Of special advantage is the use of a mixture of the specified compounds with sodium and/or potassium and/or magnesium fluosilicate.

Using the method according to the invention not only prefabricated units may be produced and materials for in situ application, but also materials which are commercial goods, such as putties, lutes, packings, sealants, mortars and the like.

Into the mixture containing the resin or elastomer and the setting system together with a filler, the expanding agent is added in an amount of 5–300% by weight with respect to the resin or the elastomer, the expansion promoter in an amount of 15–145% by weight with respect to the expanding agent, and optionally the expansion moderator in the amount of 0.4–25% by weight with respect to the amount of the expanding agent.

The sodium and/or potassium and/or magnesium fluosilicate, 2 if used, is added in an amount of 5–30% by weight with respect to the amount of the expansion moderator.

A portion of the expansion promoter not exceeding 45% by weight of the total quantity being introduced into the composition is aimed at wetting the expanding agent, whereas the remaining portion thereof is distributed in one of the components of the composition, for instance by mixing it with the filler.

The sequence and procedure of adding the remaining components to the composition is substantially discretional, provided however that the time between contacting the wetted expanding agent with the expansion promoter to the moment of mixing with the system resin hardener should not exceed 12 hours.

The expansion effect is advantageously amplified by the presence in the composition of amines, or aliphatic or aromatic or aliphatic-and-aromatic compounds containing amine groups, especially if they constitute one of the components of the polymerization reaction occurring during the setting.

An increase of the temperature within the range of 60°–110° C. influences positively the mechanism of the expansion.

The invention will be now described in particular by way of examples which, however, do not restrict the application range of the invention.

EXAMPLE 1

300 g of synthetic crystalline aluminosilicate, known under the commercial name of Zeolite 4A, is placed in a desiccator above the surface of methyl isocyanide for 26 hours, after which period a gain in weight of the Zeolite 4A by 20 g occurs due to the sorption of the methyl isocyanide. This pre-moistened crystalline aluminosilicate is mixed with fine-grained aggregate containing 150 g of quartz powder with a maximum grain size below 0.125 mm, and 75 g of fine sand with a maximum grain size of 0.125-0.5 mm, whereto preliminarily 25 g of methyl isocyanide are added. The mixture is then allowed to stand covered for 45 minutes.

After this length of time coarse-grained aggregate containing 75 g of sand with a maximum grain size 0.5-2.0 mm and 300 g of filter gravel with a maximum grain size of 2.0-4.0 mm are added. The mixture of aggregates with crystalline aluminosilicate prepared in this way is divided into two parts of equal weight. To the first part is added a solution containing 60 g of polyester resin, known under the commercial name Polimal 108, and 4 g of benzoyl peroxide in the form of a 50% paste in dibutyl phthalate. To the other portion of the aggregate mixture a mixture is added, containing 45 g of the same polyester resin and 0.5 g of a 10% solution of dimethylaniline in styrene. After thorough mixing of the components of each of said portions with a spatula, said portions are combined and placed in a power mixer with a planetary-motion paddle. After 5 minutes of mixing beams are molded, having the dimensions 4×4×16 cm, under application of vibratory compacting. The mix compacted in molds is placed in a heating chamber at a temperature of 110° C. for 18 hours. The voluminal expansion of the polyester expanding concrete amounts to 12% and the bending tensile strength and compressive strength amount to 230 kgf/cm$^2$ and 1050 kgf/cm$^2$ respectively.

EXAMPLE 2

The procedure is the same as specified in Example 1 except that instead of Zeolite 4A the crystalline aluminosilicate is used, known under the commercial name Zeolite 5A, and instead of the polyester resin Polimal 108, the resin Polimal 109 is used, and setting of the concrete is conducted not at a temperature of 110° C. but at 60° C. The expanding polyester concrete obtained in this way is characterized by a volume expansion of 7%, and a flexural tensile strength and a compressive strength equal to 240 kgf/cm$^2$ and 970 kgf/cm$^2$, respectively.

EXAMPLE 3

20 g of synthetic crystalline aluminosilicate, known under the commercial name Zeolite 4A, is wetted with 5 g of methyl alcohol according to the procedure specified in Example 1. Then said Zeolite is mixed at 80° C. with 150 g of polyisobutylene rubber, known under the commercial name Oppanol B 50. On thorough mixing and cooling down, the obtained preparation is added to the preliminarily prepared mixture of 250 g of Oppanol B 50 with 85 g of graphite powder. There is obtained a plastic expanding putty the overall voluminal expansion whereof amounts to 2%.

EXAMPLE 4

200 g of ground synthetic aluminosilicate, known by the commercial name Zeolite 4A, is added with vigorous agitation to 2 dm$^3$ of a 5% aqueous solution of zinc chloride. The mixture is heated up to a temperature of 80° C. and kept at this temperature for 2 hours with continuous agitation. Then the solution is slowly cooled down to room temperature and filtered off. The obtained residue is washed with small portions of distilled water until the Cl ions disappear from the filtrate, and then dried in a layer not exceeding 0.5 cm at a temperature of 105° C. The obtained combined zinc-and-sodium aluminosilicate of the type ZnNaA is used for preparation of a polyester mortar. To this end, 150 g of the Zeolite is wetted with 15 g of ethyl alcohol according to the procedure specified in Example 1. The wetted Zeolite is then added to a mixture of 1400 g of river sand with the addition of 135 g of ethyl alcohol. On mixing the whole is allowed to stand covered for 6 hours.

After this time a solution containing 150 g of epoxy resin, known under the commercial name Epidian 5, and 18 g of triethylenetetramine, known under the commercial name Tecza is added. The epoxy mortar obtained in this way is subjected to vibratory compacting. After hardening the expanding epoxy mortar at a temperature of 18° C. its voluminal expansion amounts to 6% and the flexural tensile strength and the compressive strength amount to 280 kgf/cm$^2$ and 1100 kgf/cm$^2$, respectively.

EXAMPLE 5

500 g of basically activated colloidal clay (bentonite) are mixed with 10 g of ethyl alcohol. The colloidal clay prepared in this way is then added to a mixture containing 1200 g of river sand with a maximum grain size of 2 mm, 600 g of granite grit with a maximum grain size of 2-5 mm, 600 g of granite grit with a grain size of 5-10 mm, 90 g of ethyl alcohol and 2 g of an aqueous solution of potassium silicate having a density of 1.34 g/cm$^3$. The whole is thoroughly mixed and allowed to stand covered for 12 hours. Then a solution is added containing 200 g of epoxy resin, known under the commercial name of Epicote 828, and modified aromatic amines, known under the commercial names Trihaedur 81 and 81 S, in amounts of 80 g and 40 g, respectively.

The concrete mix prepared in this way is submitted to vibratory compacting. The obtained epoxy concrete shows practically no shrinkage in course of setting. The bending tensile strength of this concrete amounts to 245 kgf/cm$^2$, and the compressive strength amounts to 850 kgf/cm$^2$.

EXAMPLE 6

145 g of synthetic crystalline aluminosilicate, known under commercial name Zeolite 4A, is wetted with 6 g of methyl alcohol, according to the procedure specified in Example 1. The wetted Zeolite 4A is mixed with 600 g of river sand with a maximum grain size of 2 mm, with 285 g of basalt grit with a grain size of 2-5 mm, with 600 g of basalt grit with a grain size of 5-10 mm, and with 140 g of methyl alcohol. After mixing the mixture is allowed to stand covered for 50 minutes. After this period a solution is added containing 171 g of epoxy resin, having the commercial name Epidian 5, 59 g of a polyaminoamide, known under the commercial name PAC, and 4.2 g of 2, 4, 6-tris-(dimethylaminomethyl) phenol, known under the commercial name DMF-3. The whole is mixed in a power mixer. The obtained mix of resin concrete is compacted by tamping. After setting at room temperature the expansive epoxy concrete shows an increase in volume of 6%, and its bending tensile strength and compressive strength amount to 210 kgf/cm$^2$ and 650 kgf/cm$^2$, respectively.

EXAMPLE 7

460 g of synthetic crystalline aluminosilicate, having the commercial name Zeolite 4A, is wetted with 16 g of methyl alcohol according to the procedure specified in Example 1. The wetted Zeolite 4A is mixed with 1200 g of river sand with a maximum grain size of 2 mm, 570 g of basalt grit with a grain size of 2–5 mm, 1200 g of basalt grit with a grain size of 5–10 mm and 150 g of methyl alcohol. On mixing the whole is allowed to stand covered for 85 minutes. After this time a solution is added, containing 230 g of epoxy resin, known under the commercial name Epikote 828, 140 g of a polyaminoamide, known under the commercial name of Versamine 140, and 8.0 g of 2, 4, 6-tris(dimethylaminomethyl) phenol, known under the commercial name K-54. The whole is mixed in a power mixer. The obtained concrete mix is compacted by tamping. On setting at room temperature the expanding epoxy concrete show an increase in the volume of 3.5%, and a bending tensile strength and a compressive strength of 280 and 975 kgf/cm$^2$, respectively.

EXAMPLE 8

The procedure is as specified in Example 7 except that instead of Zeolite 4A Zeolite 10X is used, and instead of methyl alcohol, ethylene dibromide is used. Expanding epoxy concrete is obtained having a voluminal expansion of 2% and a bending tensile strength and compressive strength of 300 and 1080 kgf/cm$^2$, respectively.

EXAMPLE 9

300 g of fine-crystalline synthetic aluminosilicate, known under the commercial name Zeolite 13X are added with vigorous agitation to 2dm$^3$ of a 5% solution of chromic chloride. The mixture is heated up to a temperature of 75° C. and kept at this temperature for a period of 2 hours. Then the solution is slowly cooled down to room temperature and filtered off. The obtained residue is washed with small portions of distilled water until the Cl-ions disappear from the filtrate. The above described treatment of the aluminosilicate with the solution of chromic chloride is repeated three times. The obtained residue is dried in a layer of a thickness not exceeding 0.5 cm. The obtained sodium chromium aluminosilicate NaCrX is used for fabrication of the epoxy cement. To this end, 245 g of aluminosilicate NaCrX is wetted according to the procedure specified in Example 1, with 30 g of dioxane. The aluminosilicate NaCrX wetted in this way is added to a mixture containing 300 g of quartz powder, 5 g of colloidal silica, known under the commercial name Aerosil, and 202 g of an aqueous 30% solution of sodium silicate, 240 g of dioxane and 3 g of sodium fluosilicate.

After thorough mixing, the whole is allowed to stand covered for a period of 2 hours. After this time, there is added to the prepared mix, with continuous agitation, a solution containing 230 g of epoxy resin, known as Epikote 828, and 138 g of an adduct of a polyaminoamide, known under the commercial name Versaduct 460.

The expanding epoxy cement obtained in this way is characterized by 1.5% voluminal expansion, and a bending tensile strength of 290 kgf/cm$^2$.

EXAMPLE 10

The procedure is the same as specified in Example 9, except that instead of Versaduct 460 a polyaminoamide, known as PAC, and instead of 3 g of sodium fluosilicate 18 g of magnesium fluosilicate are added.

The expanding epoxy cement obtained in this way is characterized by a 0.5% voluminal expansion on setting and by a bending tensile strength equal to 330 kgf/cm$^2$.

EXAMPLE 11

180 g of fine-pulverized fine-porous silica gel of the commercial sort SMG is wetted, according to the procedure specified in Example 1, with 10 g of 1, 3, 5-triethylbenzene. The wetted silica gel is then added to a mixture composed of 200 g of ricinus oil (castor oil) 500 g of a polyether, known under the commercial name Bypolet 320, 90 g of triethylbenzene and 1600 g of quartz powder and 10 g of colloidal silica, known under the commercial name Aerosil. After thorough mixing the whole is allowed to stand covered for a period of 30 minutes. After this time, under continuous mixing 1.5 g of tin oleate in 7 g of ricinus oil is added.

The cement mix obtained in this way is mixed with 325 g of Izocyn PP-90. The obtained cement shows on setting a voluminal expansion of 1%. Its compressive strength equals 85 kgf/cm$^2$, and its adherence to steel amounts to 15 kgf/cm$^2$.

EXAMPLE 12

120 g of aluminum oxide is wetted according to the procedure specified in Example 1 with 25 of triethylbenzene. The wetted aluminum oxide is added to a mixture of 500 g of quartz powder with 125 g of triethylbenzene. On mixing the whole is allowed to stand covered for a period of 15 minutes. Then, under continuous agitation a solution is added containing 100 g of epoxy resin, known under the commercial name Epidian 5, and 60 g of polyaminoamide, having the commercial name PAC. The mix obtained in this way is subjected to vibratory compacting and to setting at a temperature of 80° C.

The obtained product is characterized by a voluminal expansion of 1%, and by a bending tensile strength and a compressive strength of 180 kgf/cm$^2$ and 650 kgf/cm$^2$, respectively.

In the above examples, the products identified by trademarks have the following identifying characteristics:

Bypolet 320—polypropylene oxide having a molecular weight of about 3,000.

Epikote 828—unmodified liquid bisphenol A-epichlorohydrin epoxide resin, having a viscosity at 25° C. of 100–150 poise and an epoxy molar mass (weight per epoxy equivalent) of 182–194 g.

Epidian 5—epoxy resin containing 27% epoxy groups, having a maximum saponification number of 12 mg KOH/g and a viscosity of 80,000 cP at 20° C.

Izocyn PP—90—technical grade (85±5%) of 4,4-diisocyanatodiphenylmethane.

Oppanol B50—polyisobutylene having a molecular weight of about 50,000.

PAC polycondensation product of polyamines with dimers of fatty acids, having an amine number of 200–330mg KOH/g and a viscosity of 10,000–80,000 cP at 25° C.

Polimal 108—polyester resin from maleic and phthalic anhydrides and polypropylene glycol, mixed with 41±3% styrene, having a viscosity of 600 cP at 20° C. and a maximum acid number of 32.

Polimal 109—similar to Polimal 108 but having a viscosity of 650–950 cP at 25° C. and a maximum acid number of 35.

Trihaedur 81—an amine hardening agent for epoxy resins, having an amine number of 275–290, a density of 1.12 at 20° C. and a viscosity of about 10 poises at 25° C.

Trihaedur 81S—similar to Trihaedur 81 but with a density of 1.13.

Versaduct 460—an amine hardening agent for epoxy resins, having an amine number of 210–260, a density of 0.984 at 20° C., and a viscosity of 45–60 poises at 25° C.

Versamine 140—an amine hardening agent for epoxy resins, having an amine number of 350–400, a density of 0.98 at 20° C. and a viscosity of 180–230 poises at 25° C.

Zeolite 3A—artificial zeolite having the approximate formula (anhydrous form) $0.6K_2O.0.4Na_2O.Al_2O_3.2SiO_2$ and a critical pore diameter of 3.8 Å.

Zeolite 4A—artificial zeolite having the approximate formula (anhydrous form) $Na_2O.Al_2O_3.2SiO_2$ and a critical pore diameter of 4.2 Å.

Zeolite 5A—artificial zeolite having the approximate formula (anhydrous form) $0.7CaO.0.3Na_2O.Al_2O_3.2SiO_2$ and a critical pore diameter of 4.9 Å.

Zeolite 10X—artificial zeolite having the approximate formula (anhydrous form) $CaO.Al_2O_3.2.5SiO_2$ and a critical pore diameter of 8 Å.

Zeolite 13X—artificial zeolite having the approximate formula (anhydrous form) $Na_2O.Al_2O_3.2.5SiO_2$ and a critical pore diameter of 9–10 Å.

We claim:

1. In a method of producing a chemically set composition said method comprising the steps of mixing a chemically settable synthetic polymer with a filler and a setting system for said polymer and subjecting said mixture to a temperature which promotes setting, the improvement which consists of incorporating in said mixture before setting (a) 5–300% by weight based on the weight of said polymer of a porous expanding agent having sorption properties and selected from the group consisting of silica gels, aluminosilica gels, crystalline or partially crystalline natural or synthetic aluminosilicates, aluminum oxide, and activated magnesium oxide, said expanding agent being wetted with a first portion of an expansion promotor consisting of a polar solvent whose molecules have a critical diameter less than the critical diameter of the pores of said expanding agent, and (b) a second portion of said expansion promotor in an amount such that the total amount of said expansion promotor is 15–145% by weight based on the weight of said expanding agent and said first portion of said expansion promotor does not exceed 45% of the total amount of said added expansion promotor, whereby the volume of said mixture does not decrease upon setting.

2. The method of claim 1 wherein said expanding agent is a crystalline aluminosilicate of type 3A and said expansion promotor is methanol.

3. The method of claim 1 wherein said expanding agent is a crystalline aluminosilicate of type 4A and said expansion promotor is selected from the group consisting of methanol and methyl isocyanide.

4. The method of claim 1 wherein said expanding agent is a crystalline aluminosilicate of type 5A and said expansion promotor is selected from the group consisting of methanol, methylisocyanide, and halogen derivatives of ethane and methane.

5. The method of claim 1 wherein said expanding agent is a crystalline aluminosilicate of type 10X and said expansion promotor is selected from the group consisting of methanol, methyl isocyanide, halogenated derivatives of ethane and methane, dioxane, acetone, methyl ethyl ketone, toluene, and ethyl ether.

6. The method claim 1 wherein said expanding agent is a crystalline aluminosilicate of type 13X and said expansion promotor is selected from the group consisting of methanol, methyl isocyanide, halogenated derivatives of ethane and methane, dioxane, acetone, methyl ethyl ketone, toluene, ethyl ether and 1,3,5-triethylbenzene.

7. The method of claim 1 wherein the temperature which promotes setting is 60° to 110° C.

8. The method of claim 1 further comprising incorporating in said mixture 0.4–25% by weight based on the weight of said expanding agent of an expansion moderator selected from the group consisting of amorphous and partially amorphous silicates and aluminosilicates containing cations selected from the group consisting of cations from Groups I and II of the Periodic Table of Elements, aluminum cations and ammonium cations and 5–30% by weight based on the weight of said expansion moderator of a fluosilicate selected from the group consisting of sodium, potassium and magnesium fluosilicates.

9. The method of claim 1 wherein said polymer is selected from the group consisting of polyesters based on polypropylene glycol, phthalic acid anhydride and maleic anhydride, polyisobutylene, phenolformaldehyde resins and polypropylene oxide.

* * * * *